No. 666,206. Patented Jan. 15, 1901.
R. O. NEVILLE.
POLE OR SHAFT COUPLING.
(Application filed June 15, 1900.)
(No Model.)
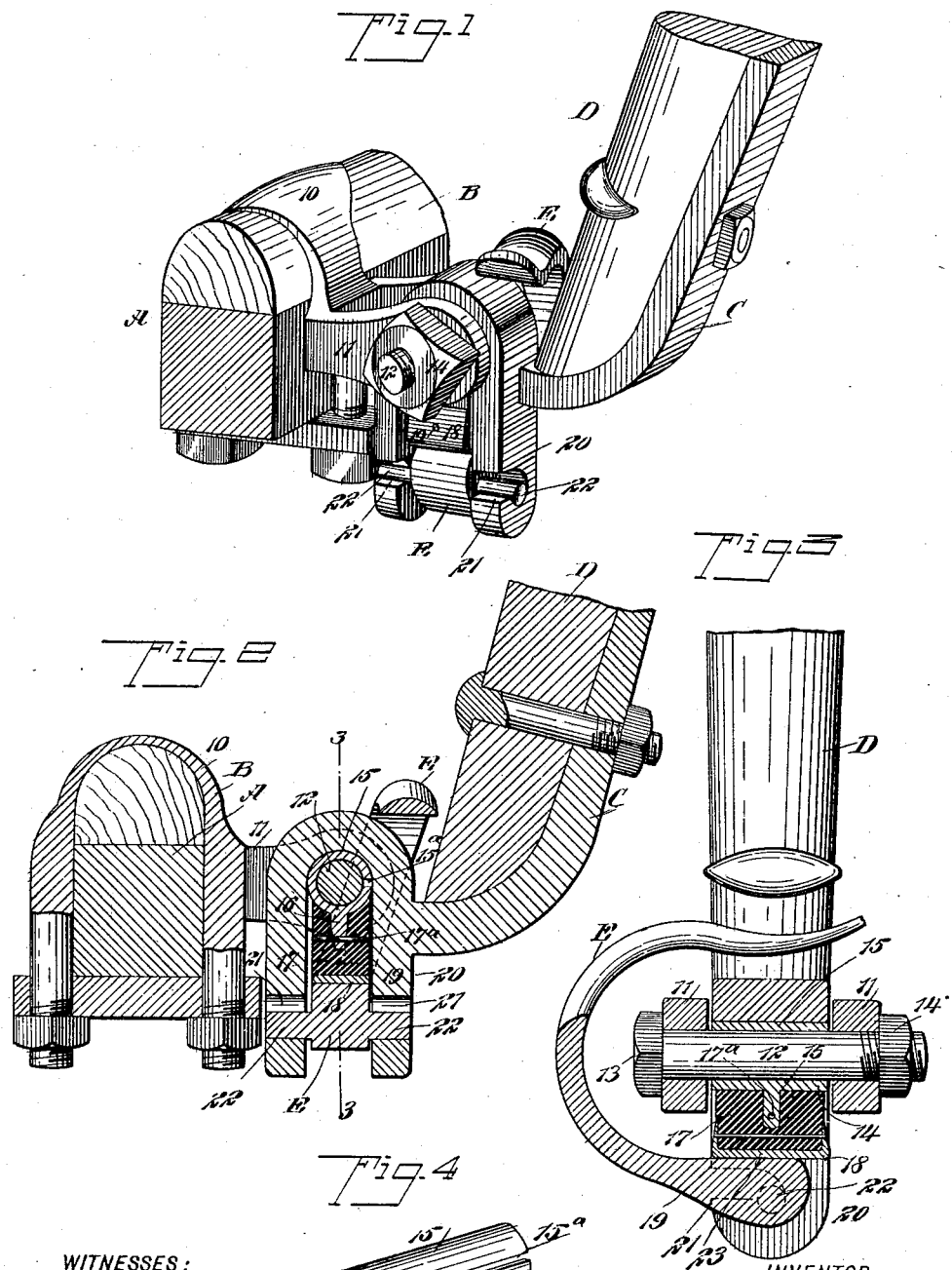
WITNESSES:
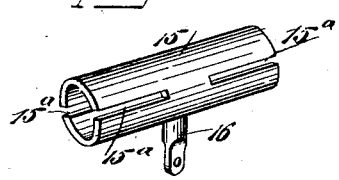
INVENTOR
Robert O. Neville.
BY
ATTORNEYS

UNITED STATES PATENT OFFICE.

ROBERT O. NEVILLE, OF ELKHART, INDIANA.

POLE OR SHAFT COUPLING.

SPECIFICATION forming part of Letters Patent No. 666,206, dated January 15, 1901.

Application filed June 15, 1900. Serial No. 20,437. (No model.)

*To all whom it may concern:*

Be it known that I, ROBERT O. NEVILLE, a citizen of the United States, and a resident of Elkhart, in the county of Elkhart and State of Indiana, have invented a new and useful Improvement in Pole or Shaft Couplings, of which the following is a full, clear, and exact description.

The invention relates to pole and shaft couplings; and the purpose of the invention is to provide a simple antirattling coupling of this class which will hold the pole-iron or thill-irons connected with the draw-shackles while the pole or thills are in use, or when they have been placed in an upper or lower position for storage of the vehicle, or when the animal or animals are unharnessed, and, furthermore, to so construct the device that the thill-irons or pole-iron may be quickly and conveniently disconnected from the draw-shackles of the vehicle when occasion may demand.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved coupling. Fig. 2 is a longitudinal vertical section through the complete coupling. Fig. 3 is a vertical transverse section on the line 3 3 of Fig. 2, and Fig. 4 is a detail perspective view of the bushing used in connection with the draw-shackle.

A represents an axle of a vehicle, and B the draw-shackle which is carried by the axle. This draw-shackle consists of a clip 10, secured to the axle in any suitable or approved manner, and this clip at its upper forward portion is provided with horizontal parallel jaws 11, in which jaws a bolt 12 is located, having a head 13 at one end and a nut 14 at the opposite end, as is illustrated in Fig. 3.

A sleeve 15 is mounted to turn on the bolt 12 between the jaws 11 of the clip, and, as shown in Fig. 4, this sleeve is provided with longitudinal slots 15ª in opposite sides, so that the sleeve may fit snugly to the bolt 12, around which it turns, and thus obviate any rattling noise in the operation of the device. This sleeve 15 is provided with a downwardly-extending member 16, and this member 16 is attached by a rod or a pin 17ª to an elastic or yielding block 17, preferably of rubber, the bottom portion of which block is fitted with a metal shoe 18, and this shoe is attached to the block 17 by means of one or more pins or rods 19, as is shown in Fig. 3.

D represents a thill or pole which is attached to an iron C, curved at its inner or rear end, the attachment of the thill or pole being made in any suitable or approved manner. At the inner end of the iron C an open shaft-eye 20 is formed. This shaft-eye is preferably of inverted-U shape and is provided at the lower portion of its members at one side with recesses 21, and in each of said recesses a cavity is made in the bottom wall thereof. The recesses admit and the cavities in the recesses of the shaft-eye receive trunnions 22, which extend from a lock-lever E, which lock-lever is also substantially of a U shape, and when its trunnions are placed in the recesses 21 the lock-lever has a hinged or pivotal connection with the open shaft-eye 20, and when the lever E is in locking position its free end extends up over the upper portion of the shaft-eye 20, as shown in Figs. 1 and 3, and a plain surface 23 at the upper portion of the pivotal end of the lever E is in engagement with the shoe 18 of the elastic block 17, compressing said shoe, and this elastic block serves to assist in holding the lever in its locked position and also tends to contract the sleeve or bushing 15 around the bolt 12, upon which it turns.

The lock-lever E is eccentrically mounted in the shaft-eye 20, and therefore when the lock-lever is carried to its locking position it will of its own accord remain in such position. When it is desired to remove the thills or pole from the draw shackle or shackles B, the lever E is carried to a lowered position and disengaged from the shaft-eyes, whereupon the shaft-eyes may be raised and quickly disconnected from the draw shackle or shackles; but this disconnection cannot be made until the pole or thills are in a full upper or rearwardly-extending position.

Having thus described my invention, I claim as new and desire to secure by Letters Patent—

1. In a thill-coupling, the combination, with a draw-shackle, a pin or bolt carried by the shackle, a bushing mounted on the pin or bolt, and an elastic member connected with the said bushing, of an open shaft-eye which extends over and at opposite sides of the said bushing, and a lock-lever eccentrically pivoted in the shaft-eye, which lever is adapted to exert pressure on the elastic member of the bushing when in a locked position, as described.

2. The combination, with the draw-shackle of a vehicle, a pin or bolt carried by the said shackle, a slotted bushing mounted upon the said bolt or pin, and an elastic member connected with the under portion of the said bushing, of a shaft-eye substantially U-shaped, which shaft-eye is passed over the said bushing, extending at opposite sides below the same, the shaft-eye having open bearings at its lower portion, and a lever eccentrically mounted in the said open bearings, which lever when in locking position exerts direct upward pressure on the elastic member of the bushing, for the purpose set forth.

3. The combination, with a draw-shackle, comprising a clip, parallel jaws horizontally and forwardly extended from the said clip, a bolt or pin mounted in the said jaws, a slotted bushing fitted to the bolt or pin between the jaws, an elastic block connected with the bottom portion of the bushing, and a metallic shoe at the bottom portion of the block, of an open or inverted-U-shaped shaft-eye having open bearings in one side of its lower extremities, and a locking-lever eccentrically mounted in the said open bearings, the said locking-lever being provided with a surface adapted to engage with the shoe of the flexible block when the said lever is in locking position, the upper portion of the lever when the lever is in locking position being arranged to extend above the upper portion of the shaft-eye, for the purpose described.

In testimony whereof I have signed my name to this specification in the presence of two subscribing witnesses.

ROBERT O. NEVILLE.

Witnesses:
LOUIS S. FRINK,
ARTHUR S. FRINK.